(12) United States Patent
Poornachandran et al.

(10) Patent No.: US 10,768,863 B2
(45) Date of Patent: Sep. 8, 2020

(54) SECURITY MONITORING AGENT FOR FIELD PROGRAMMABLE GATE ARRAY (FPGA) IN-MEMORY CONTROLLER

(71) Applicant: INTEL CORPORATION, Santa Clara, CA (US)

(72) Inventors: Rajesh Poornachandran, Portland, OR (US); Vincent J. Zimmer, Federal Way, WA (US); Ned M. Smith, Beaverton, OR (US); Nadhiya Chandramohan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 147 days.

(21) Appl. No.: 15/476,693

(22) Filed: Mar. 31, 2017

(65) Prior Publication Data

US 2018/0288097 A1 Oct. 4, 2018

(51) Int. Cl.
| | |
|---|---|
| *G06F 21/00* | (2013.01) |
| *G06F 3/06* | (2006.01) |
| *G06F 21/76* | (2013.01) |
| *H04L 29/06* | (2006.01) |
| *G06F 21/55* | (2013.01) |
| *G06F 12/02* | (2006.01) |
| *G06F 12/14* | (2006.01) |

(52) U.S. Cl.
CPC ............ *G06F 3/067* (2013.01); *G06F 3/0622* (2013.01); *G06F 3/0659* (2013.01); *G06F 3/0673* (2013.01); *G06F 21/55* (2013.01); *G06F 21/76* (2013.01); *H04L 63/1416* (2013.01); *G06F 12/0292* (2013.01); *G06F 12/1408* (2013.01)

(58) Field of Classification Search
CPC .... G06F 3/067; G06F 3/0673; G06F 12/0871; G06F 12/0804; G06F 12/0802; G06F 21/55; G06F 9/467; G06F 3/0659; G06F 3/0622; G06F 21/76; H04L 63/1416
See application file for complete search history.

(56) References Cited

U.S. PATENT DOCUMENTS

| | | | | |
|---|---|---|---|---|
| 5,428,758 A | * | 6/1995 | Salsburg | G06F 12/0607 711/165 |
| 9,449,134 B1 | * | 9/2016 | Moussalli | G06F 17/5054 |
| 9,483,282 B1 | * | 11/2016 | Vandervennet | G06F 15/7871 |

(Continued)

FOREIGN PATENT DOCUMENTS

| | | | | |
|---|---|---|---|---|
| EP | | 2998869 A1 * | 3/2016 | G06F 12/10 |

*Primary Examiner* — Joseph P Hirl
*Assistant Examiner* — Ka Shan Choy
(74) *Attorney, Agent, or Firm* — Barnes & Thornburg LLP

(57) ABSTRACT

Techniques related to preventing unauthorized access to a computing device are disclosed. The techniques include a machine-readable medium, on which are stored instructions, comprising instructions that when executed cause a device to identify a host hardware configuration, obtain a policy based on the host hardware configuration, monitor two or more memory transactions based on the policy, identify, based on the memory transactions, a memory transaction pattern, wherein the memory transaction pattern is associated with an attempt to obtain unauthorized access to the device, and take one or more actions to interfere with attempts to obtain unauthorized access to the device based on the policy.

18 Claims, 6 Drawing Sheets

(56) References Cited

U.S. PATENT DOCUMENTS

| | | | |
|---|---|---|---|
| 2006/0190987 A1* | 8/2006 | Ohta | G06F 21/57 |
| | | | 726/1 |
| 2009/0228963 A1* | 9/2009 | Pearce | G06F 21/31 |
| | | | 726/5 |
| 2012/0240185 A1* | 9/2012 | Kapoor | H04L 63/1425 |
| | | | 726/1 |
| 2016/0080418 A1* | 3/2016 | Ray | H04L 63/20 |
| | | | 726/1 |
| 2016/0202749 A1* | 7/2016 | Milton | G06F 1/30 |
| | | | 713/340 |

* cited by examiner

SECURITY MONITORING AGENT FOR FIELD PROGRAMMABLE GATE ARRAY (FPGA) IN-MEMORY CONTROLLER

TECHNICAL FIELD

Embodiments described herein generally relate to the field of computer security and, more particularly, to methods and systems related to a security monitoring agent for FPGA in-memory controllers.

BACKGROUND ART

The field of computer security has become increasingly important and complicated in today's society. Computer network environments are configured for virtually every enterprise or organization, typically with multiple interconnected computers (e.g., end user computers, laptops, servers, printing devices, etc.). In many such enterprises, Information Technology (IT) administrators may be tasked with maintenance and control of the network environment, including executable software files (e.g., web application files) on hosts, servers, and other network computers. As the number of executable software files in a network environment increases, the ability to control, maintain, and remediate these files efficiently can become more difficult. Furthermore, computer and communications networks today encompass mobile devices such as smartphones, tablet computers and the like, which allow users to download and install applications on these devices quickly and with minimal oversight. Thus, innovative tools are needed to assist IT administrators in the effective control and management of applications on mobile devices within computer and communication network environments. Such tools may include tools related to a security monitoring agent for FPGA in-memory controllers.

Malicious software may attempt to obtain unauthorized access to a computing device by exploiting physical characteristics of the computing device. As an example, a class of attacks known as rowhammer may attempt to gain unauthorized access using specially crafted memory transaction patterns. These memory transaction patterns are crafted to access memory in a specific manner, which by itself is permitted. However, in a rowhammer attack, these memory access are rapidly repeated, for example, "hammering" a specific memory row, causing one or more bits of memory in a nearby row to flip and allowing access to a privileged portion of memory. Consequently, there is a need for an effective method for monitoring and mitigating memory-based exploits, such as a security monitoring agent for FPGA in-memory controllers.

DESCRIPTION OF EMBODIMENTS

Figure 1:
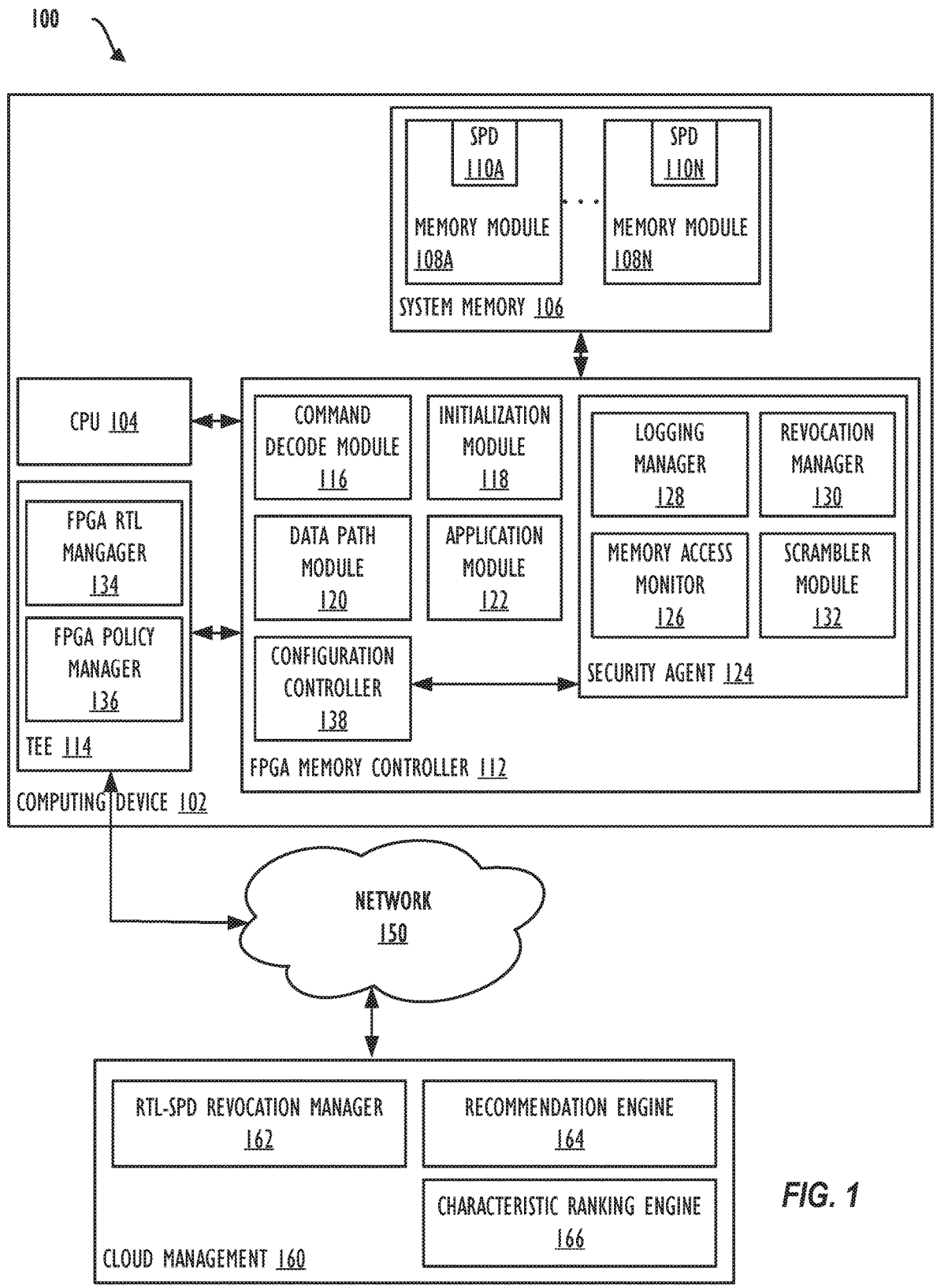
FIG. 1 is a block diagram illustrating a system for monitoring FPGA in-memory controller, according to one embodiment.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, trust generally refers to an expectation that a device will behave in a particular manner for a specific purpose. In establishing a trust relationship, trusted components are able to vouch, or attest, for their own integrity by collecting and providing evidence that the component has not been tampered with. For example, a component may be measured to generate an indication associated with the component such that any change to the component produces a change in the indication. In one example, a cryptographic hash value of the component may be made, the cryptographic hash having strong collisions resistance such that any changes to the component results in a different hash value. This resulting hash value may be compared to an expected value, to detect any changes to the component. An indication of the integrity of the component may then be passed on attesting that the component has not been tampered with in establishing the trust relationship. Additionally, other techniques for attestation may be used and other types of measurement techniques may also be used as desired.

As used herein, the term "a computing device" can refer to a single computing device or a plurality of computing devices working together to perform the function described as being performed on or by the computing device. Similarly, "a machine-readable medium" can refer to a single physical medium or a plurality of media that together may store the material described as being stored on the machine-readable medium.

As indicated above, malicious software may attempt to gain unauthorized access to a computing device by exploiting physical characteristics of components of the computing device. As an example, some malicious software may perform a rowhammer type attack against a memory of the computing device.

In many cases, a computing device includes a memory comprising of dynamic random access memory (DRAM) to provide a cost effective and high capacity main memory. Generally, DRAM is structurally simple, having only one transistor and a capacitor per bit (e.g., memory cell). Data is stored in DRAM based on the charge state of the capacitor of the bit. The capacitors of the bits lose charge over time and must be rewritten periodically (e.g., refreshed) to preserve the state of the bit. As bits are relatively simple, bits may be densely arranged in arrays with rows connected via word-lines and columns connected via bit-lines. The bit-lines are connected to sense amplifiers. In order to read a particular bit, all the bits in the row in which the particular bit is located are activated and sensed by the sense amplifiers. When activated, the capacitors of the bit charge or discharge into the bit lines and the sense amplifiers, which reads the voltage changes. All bits within the row are read at a time, even if only a single bit was requested by a software process. This reading of the bits of a row is destructive of the charge stored in the bits and the bits need to be rewritten after a read operation.

As DRAM densities have increased, the size and charge capacity of bits have decreased, resulting in lower operational noise margins and increased sensitivity to unwanted electromagnetic interactions. This sensitivity may be exploited by rapidly accessing a particular DRAM row nearby a target row. Rapid row activation may cause voltage fluctuations in nearby row selection lines, potentially inducing higher than expected capacitor discharge rates in nearby rows. This increased discharge rate may cause certain capacitors to lose enough charge to flip the bit associated with the capacitors if the bits are not refreshed in time.

Previous attempts to address such vulnerabilities have attempted to increase the rate at which the memory is refreshed. While increasing the refresh rate of memory decreases the probability that a rowhammer type attack will succeed, this does not attempt to address the underlying vulnerabilities.

Generally, to induce a bit to flip, one or more nearby rows are accessed rapidly. In order to usefully exploit the induced bit flip, an attacker generally targets a specific row or bit. This specific targeting takes advantage of a consistent mapping between system physical address (SPA) to DRAM physical addresses (DPA). Generally, a processor may address memory using a particular SPA. This particular SPA represents a particular DPA, but the SPA itself does not indicate an exact row and column address in DRAM. Rather, the SPA must be mapped to the row and column DPA. For example, a SPA may be a hexadecimal number, such as 0xf0000001. However, this number does not, by itself, indicate where a particular bit referenced by the SPA is physically located. Rather, the SPA is mapped to a particular DPA. This mapping may be performed by, for example, a memory controller, which maps the SPA to an associated DPA. The memory controller may then request all the bits from a particular row from the memory module. The memory controller selects the particular bit after receiving all the bits from the requested row, and returns the selected bit referenced by the SPA.

This mapping between SPA and DPA may vary based on the physical characteristics of the memory module, such as a number of memory chips within a module, a capacity of the memory chips, a number of rows and columns utilized, etc. However, given a particular set of hardware characteristics, the mapping between SPA and DPA is generally fixed and the mapping may be guessed or reversed engineered. In some cases, this mapping may be fixed at manufacturing time in the memory controller and may not be changed.

In certain cases, implementing a memory controller as a FPGA allows the memory controller and mapping to be reconfigured and updated to account for evolving security threats. Generally, a FPGA is an integrated circuit which may be reconfigured after manufacturing. For example, a memory controller implemented on a FPGA may be updated after manufacturing to change the mapping between SPA and DPA. Where an attempt to gain unauthorized access is detected, the FPGA memory controller may be updated to scramble the SPA to DPA mappings. This scrambling prevents malicious software from locating rows near the specific row or bit. Information from the detected attempt may be uploaded and analyzed to help identify new or evolved threats and the FPGA memory controller may be updated to address these threats.

It should be understood that although described in conjunction with DRAM and rowhammer type attacks, the techniques described herein may be applied to other types of memory and other exploits having a describable memory transaction pattern.

FIG. 1 is a block diagram illustrating a system 100 for monitoring a FPGA in-memory controller, according to one embodiment. As illustrated, system 100 may include a computing device 102, a network 150, and a cloud management server device 160. The computing device may include a CPU 104 along with system memory 106, a FPGA memory controller 112, and a trusted execution environment (TEE) 114. The system memory 106 may include one or more memory modules 108A . . . 108N (collectively 108). The memory modules 108 may be utilized for system main memory and comprise DRAM modules. Each DRAM module may also contain one or more memory chips (not shown). However, while examples are presented in conjunction with DRAM based memory, it should be understood other embodiments may be implemented with different types of memory. Each memory module 108 may include a serial presence detect (SPD) module 110A . . . 110N (collectively 110). The SPD module contains SPD information which describes characteristics of the memory module, such as timing information, size of the module, voltages supported, revision number, manufacturer, serial number, and so forth.

The FPGA memory controller 112 may include multiple modules for handing memory transactions, such as a command decode module 116 for decoding the memory transaction requested, an initialization module 118 for initializing DRAM module states, a data path module 120 for mapping specific bit lanes based on a DPA, and an application module 122. The FPGA memory controller may also include a security agent 124, which may include a memory access monitor 126, a logging manager 128, a revocation manager 130, and a scrambler module 132. The memory access monitor 126 of the security agent 124 may monitor memory requests and transactions to identify suspicious memory transaction patterns associated with an attempt to gain unauthorized access. The logging manager 128 may log monitored memory requests or other functions of the security agent. These logs may be encrypted and uploaded to the cloud management server 160 for further analysis. The revocation manager 130 may enforce security policies. For example, lists of secure combinations of memory modules and memory controllers may be maintained in the cloud management server 160 in a whitelist. If a particular combination of memory module and memory controller is not whitelisted (or is blacklisted), access to certain resources may be limited for a particular memory module and FPGA memory controller combination. For example, access to sensitive data may be restricted, execution in a TEE limited, a warning passed or error raised, or other policy restriction may be imposed. The scrambler module 132 may implement and coordinate DPA to SPA scrambling.

As shown, the FPGA memory controller 112 implements the functionality of a memory controller as a FPGA. It may be understood that a FPGA may be used to provide certain functionally for a memory controller in conjunction with other types of processors and integrated circuits, such as application specific integrated circuits (ASIC), which may not be reconfigurable after manufacturing.

The TEE 114 may be communicatively coupled to the FPGA memory controller 112. The TEE 114 may be provided by a security component, such as a trusted platform module (TPM). Generally, the TPM is a hardware component that resides within a processing system and provides various facilities and services for enhancing the security of the processing system by enabling the establishing of trust relationships. Trust relationships may be established by attesting to the authenticity of components of the computing system by measuring the software and hardware components via, for example, by performing a cryptographic hash on the software, firmware, loader or other component. Measurements may be made of code, data structures, configuration, information, or anything that can be loaded into memory and measurements are performed such that if the component being measured has been altered or changed, the results of the measurement would be different. Attested software may be executed in or obtain services from the TEE 114 and the TEE 114 ensures that the software executing within is authentic and trusted. The TEE 114 may also be communicatively coupled, via network 150, to the cloud management server 160. This connection may be an out of band (e.g., a separate, dedicated communications channel) connection and this connection may be used for remote management and configuration of the FPGA memory controller.

As shown, a FPGA register transfer level (RTL) manager 134 and a FPGA policy manager 136 may execute in the context of a TEE 114. The FPGA policy manager 136 may obtain and provide to the FPGA memory controller, memory transaction patterns indicative of attacks. The FPGA policy manager 136 may also provision and enforce various policies that may be set for the FPGA memory controller 112. The RTL manager 134 may coordinate reconfiguration of the FPGA memory controller 112. For example, the RTL control manager 134 may coordinate, with the configuration controller 138, restructuring one or more modules of the security agent 124 based on a particular RTL description of a FPGA circuit configuration.

The particular bit stream or policy may be obtained from a RTL-SPD revocation manager 162 on the cloud management server 160 via network 150. Examples of the network 150 include a local area network (LAN), a general wide area network (WAN), and/or a public network (e.g., the Internet).

The RTL-SPD revocation manager 162 may maintain a whitelist of combinations of memory modules and FPGA memory controllers based on SPD information from the memory modules. The RTL-SPD revocation manager 162 may also include RTLs associated with certain combinations of FPGA memory controllers and memory modules. These RTLs may describe various configurations for the FPGA memory controller which may help address potential vulnerabilities. For example, if a certain memory module and memory controller combination are susceptible to rowhammer style attacks, a RTL describing a FPGA memory controller implementing DPA to SPA scrambling may be created and transmitted to the FPGA computing device. Where a computing device having the certain combinations of memory modules and FPGA memory controllers contacts the RTL-SPD revocation manager 162 the computing device may receive the RTL implementing DPA to SPA scrambling for use by the FPGA memory controller.

The RTL-SPD revocation manager 162 may also receive, from multiple computing devices, log information via Logging Manager 128 for memory access requests over time. This log information may be analyzed by a characteristic ranking engine 166, which may apply various machine learning and pattern recognition techniques to determine whether a particular FPGA memory controller and memory module combination are vulnerable to attack. If so, the recommendation engine 164 may determine appropriate policies or initiate a process by which RTLs may be prepared.

Figure 2:
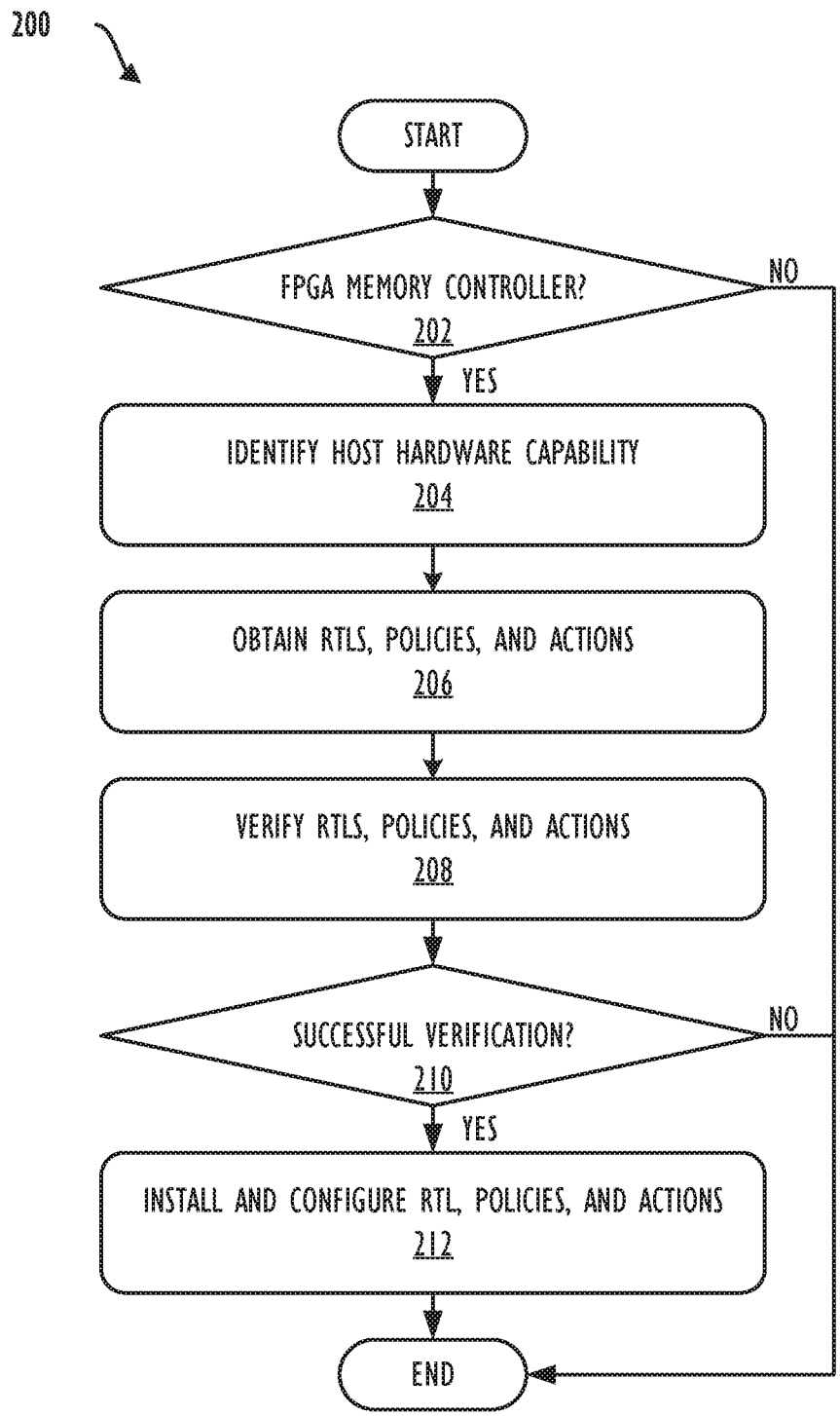
FIG. 2 is a flow diagram illustrating calls for the security agent for FPGA in-memory controller, according to one embodiment.

FIG. 2 is a flow diagram illustrating a technique 200 for configuring a FPGA in-memory controller, according to one embodiment. At block 202, the memory controller is verified as a FPGA based memory controller. At block 204, host hardware capabilities are identified. For example, the FPGA RTL manager may identify information related to the capabilities of the FPGA memory controller, such as available logic blocks or current RTL version, as well as the capabilities of the memory modules based on the SPD information. At block 206, policies and actions may be obtained. For example, the FPGA RTL manager may connect via the network and provide to the RTL-SPD revocation manager memory module and FPGA memory controller capability information. When contacted by the FPGA RTL manager, the RTL-SPD revocation manager returns policies, actions, and RTLs to the FPGA RTL manager.

The RTL-SPD revocation manager may have information related to FPGA memory controllers and memory modules. For example, the RTL-SPD revocation manager may maintain a list of SPDs and policies associated with the SPDs, as well as corresponding RTLs for compatible FPGA memory controllers for the SPDs in the list. There may be more than one list. One possible is includes a whitelist for combinations of FPGA memory controller and SPDs considered secure, and/or for which there are RTLs available that address known vulnerabilities. The lists may also include a blacklist of SPDs which are known to be exploitable and for which there may not be a RTL available to address the exploit.

The actions and policies for a particular set of memory modules and FPGA memory controller may, for example, specify one or more attack signature memory transaction patterns for known attacks. The actions and policies may include suspicious memory transaction patterns, such as a memory transaction pattern having a certain number of attempts to access a particular row within a certain time period. Example of specified actions that may be taken in response to detecting known or suspicious memory transaction patterns may include scrambling or logging. The actions and policies may also, for example, indicate that the particular set of memory modules and FPGA memory controller are not considered secure. In such cases, a warning may be passed up to the operating system or application layers indicating this status. In some cases, access to sensitive data may be disabled or other policy based actions will be enforced.

At block 208, any received RTLs and associated policies may be verified. For example, the FPGA policy manager may check the attestation information of the received RTLs and associated policies and actions as a part of an attestation procedure. If successfully verified at block 210, the received RTLs and associated policies and actions may be installed or configured at block 212. Policies and actions may be implemented by the FPGA policy manager. For received RTLs, the FPGA RTL manager may determine what portions of the FPGA memory controller should be reconfigured and indicate to the configuration controller to place the FPGA memory controller in a state where those portions of the FPGA memory controller may be reconfigured. For example, where a particular RTL may reconfigure the scrambler module of security agent, the configuration controller may receive an indication that the particular RTL bit stream reconfigures the scrambler module. The configuration controller then prepares that portion of the FPGA for reconfiguration. The RTL bit stream may then be written to that portion of the FPGA.

Figure 3:
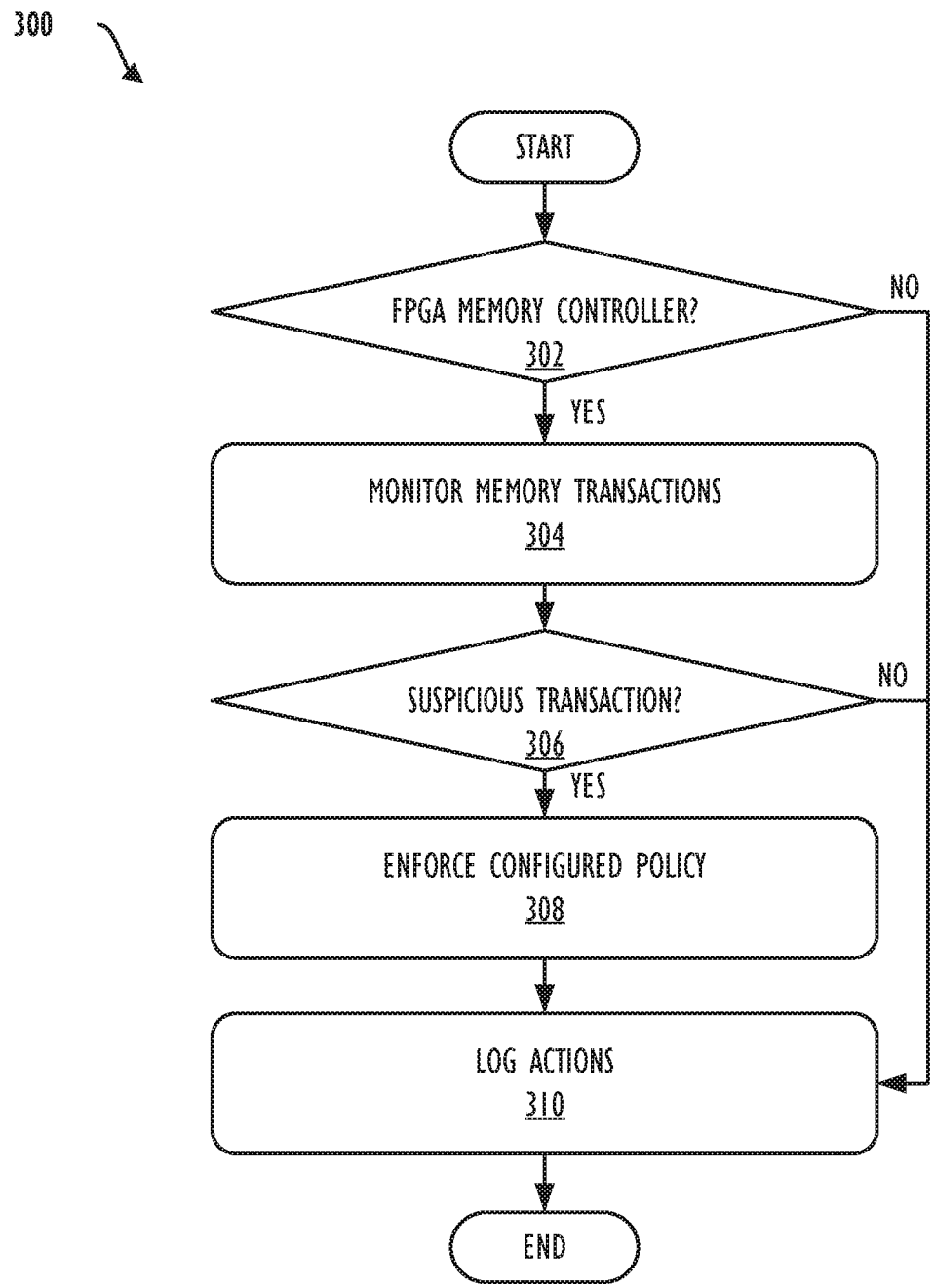
FIG. 3 is a flow diagram illustrating a technique for monitoring a FPGA in-memory controller, according to one embodiment.

FIG. 3 is a flow diagram illustrating a technique 300 for monitoring a FPGA in-memory controller, according to one embodiment. At block 302, the memory controller is verified as a FPGA based memory controller. At block 304, memory transactions may be monitored. The memory access monitor may include, or may be able to access, various memory counters which provide information related to memory access. For example, memory counters may count the number of times a row is accessed, how often the access occurs in terms of memory bandwidth used, how much throughput data is sent as a result of the memory access, and so forth. The memory access monitor may monitor the memory counters in order to identify suspicious memory transaction patterns or memory transaction patterns associated with an attack signature. In addition, monitoring may take into account memory configurations as well. For example, the rate at which memory bits are refreshed or whether memory is throttled may also be monitored. If a suspicious or attack memory transaction pattern is detected at block 306, a configured policy is enforced at block 308. A particular policy may be associated with a known attack signature memory transaction pattern, such as for a rowhammer type attack. The particular policy may implement DPA to SPA scrambling if the known attack signature memory transaction pattern is detected. In certain cases, this scrambling may be implemented by reconfiguring one or more modules of the FPGA memory controller, such as the data path module. This reconfiguration may be based on a previously obtained RTL. In such cases, the FPGA may be reconfigured by the FPGA RTL manager and configuration controller. In other cases, where the RTL was not previously obtained, the FPGA policy manager may attempt to connect to the RTL-SPD revocation manager to check whether an RTL is available or download an available RTL. In certain cases, a default action may be taken. For example, in case of a suspicious memory transaction pattern, logging, or more detailed logging than usual, may be initiated. The rate at which memory bits are refreshed may also be increased. At block 310, any actions taken may be logged. For example, the logging manager may be configured to log any functionality of the security agent, such as memory transaction pattern comparisons, reconfigurations, scrambling, memory configurations, etc. The level of logging may also be varied based on, for example, memory state, memory transaction pattern observed, policy, etc.

Figure 4:
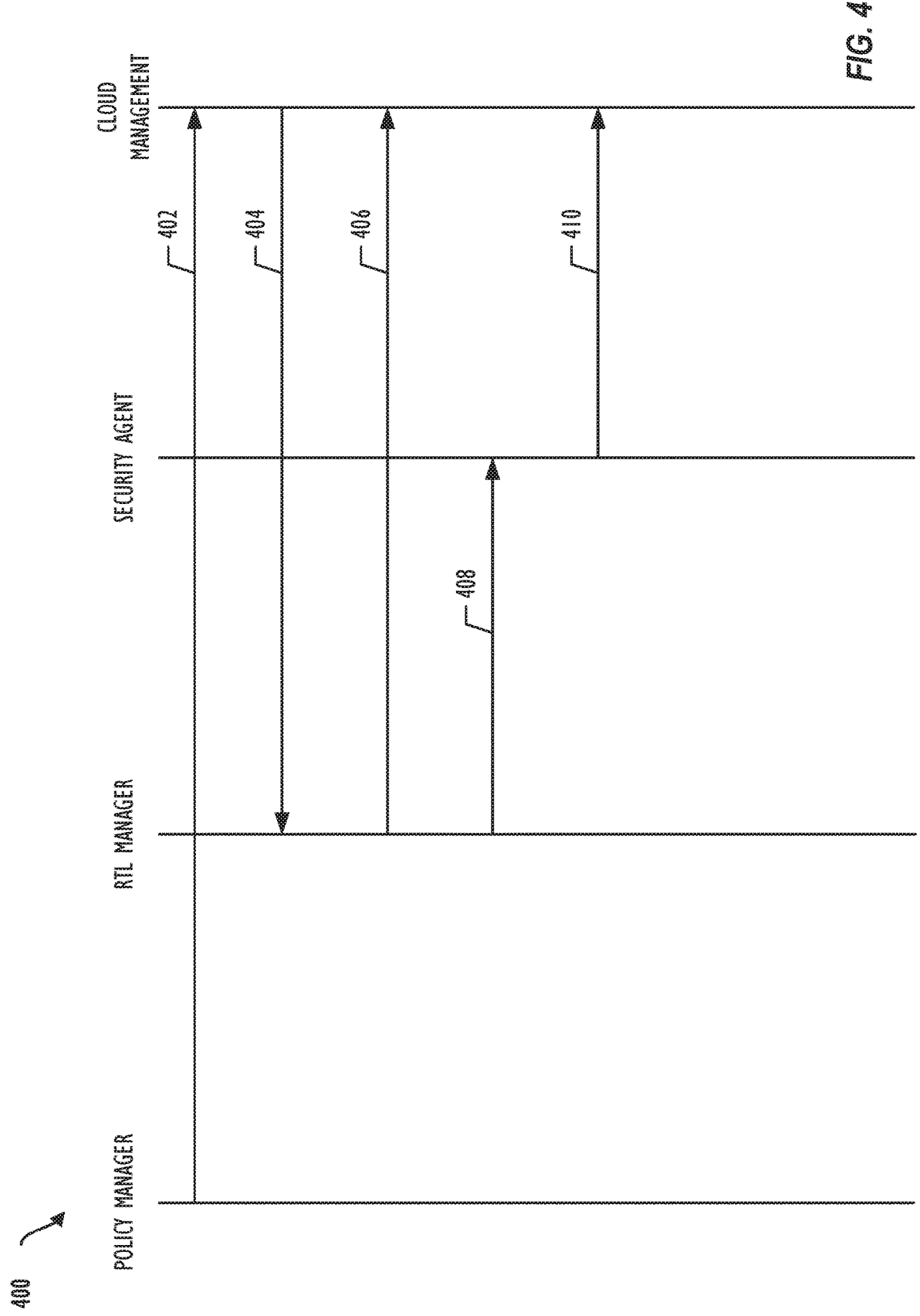
FIG. 4 is a call flow diagram illustrating call flows for a FPGA in-memory controller, according to one embodiment

FIG. 4 is a call flow diagram illustrating call flows 400 for a FPGA in-memory controller, according to one embodiment. At flow 402, the FPGA policy manager transmits host hardware information to the cloud management server. After identifying the host hardware, such as the memory modules based on the SPD information and the FPGA memory controller, the FPGA policy manager connects to cloud management server and transmits the host hardware information. This information may be used by the cloud management server to identify RTLs, policies, revocation information, attack signatures, or other information associated with the identified host hardware. At flow 404, the information identified by the cloud management server is returned to the FPGA policy manager. Based on this information identified the FPGA policy manager may implement policies, reconfigure the FPGA memory controller, or update attack signatures. The returned information may be verified by attestation by the TEE to ensure that the information is trusted. The FPGA RTL manager may acknowledge receiving and verifying the information at flow 406.

At flow 408, the policy, RTL, or attack signature may be implemented by one or more modules of the FPGA memory controller, for example, by the memory access monitor. The memory access monitor may receive an attack signature, monitor memory transactions patterns for the attack signature, and take an action specified by policy if the attack signature is detected. In addition, information related to memory transactions may be logged. For example, information related to the memory transaction patterns observed by the memory monitor may be logged. In certain cases, such as when a suspicious memory transaction pattern is observed, more detailed logs may be kept, as compared to logs recorded in the absence of the suspicious memory transaction pattern. Additionally, when memory modules are changed for a device, such as during a hot add or swap, logging for information related to the memory transaction patterns may be triggered. In certain cases, logging may be configured by policy, for example at set intervals, or on an as-needed basis triggered by the cloud management server. At 410, memory transaction logs may be uploaded to the cloud management server. The cloud management server may collect memory transaction logs from multiple computing devices and apply machine learning algorithms to detect, for example, memory transaction patterns associated with attempts to gain unauthorized access across multiple computing devices. Detected memory transaction patterns may then be added to the known attack patterns or RTLs may be prepared, for example, to implement scrambling.

Figure 5:
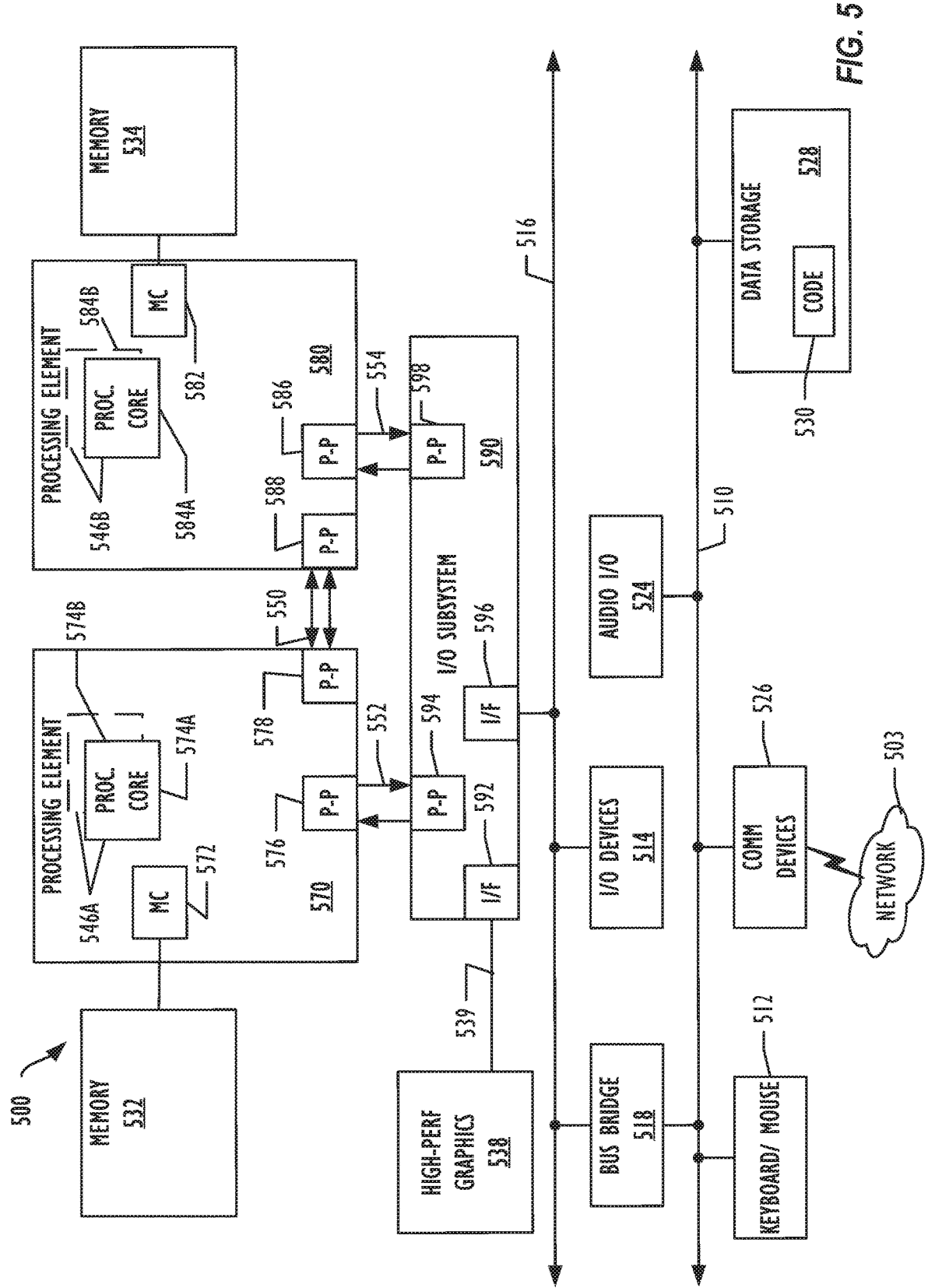
FIG. 5 is a block diagram illustrating a programmable device, according to one embodiment.

Referring now to FIG. 5, a block diagram illustrates a programmable device 500 that may be used for implementing the techniques described herein in accordance with one embodiment. The programmable device 500 illustrated in FIG. 5 is a multiprocessor programmable device that includes a first processing element 570 and a second processing element 580. While two processing elements 570 and 580 are shown, an embodiment of programmable device 500 may also include only one such processing element.

Programmable device 500 is illustrated as a point-to-point interconnect system, in which the first processing element 570 and second processing element 580 are coupled via a point-to-point interconnect 550. Any or all of the interconnects illustrated in FIG. 5 may be implemented as a multi-drop bus rather than point-to-point interconnects.

As illustrated in FIG. 5, each of processing elements 570 and 580 may be multicore processors, including first and second processor cores (i.e., processor cores 574a and 574b and processor cores 584a and 584b). Such cores 574a, 574b, 584a, 584b may be configured to execute instruction code. However, other embodiments may use processing elements that are single core processors as desired. In embodiments with multiple processing elements 570, 580, each processing element may be implemented with different numbers of cores as desired.

Each processing element 570, 580 may include at least one shared cache 546. The shared cache 546a, 546b may store data (e.g., instructions) that are utilized by one or more components of the processing element, such as the cores 574a, 574b and 584a, 584b, respectively. For example, the shared cache may locally cache data stored in a memory 532, 534 for faster access by components of the processing elements 570, 580. In one or more embodiments, the shared cache 546a, 546b may include one or more mid-level caches, such as level 2 (L2), level 3 (L3), level 4 (L4), or other levels of cache, a last level cache (LLC), or combinations thereof.

While FIG. 5 illustrates a programmable device with two processing elements 570, 580 for clarity of the drawing, the scope of the present invention is not so limited and any number of processing elements may be present. Alternatively, one or more of processing elements 570, 580 may be an element other than a processor, such as an graphics processing unit (GPU), a digital signal processing (DSP) unit, a field programmable gate array, or any other programmable processing element. Processing element 580 may be heterogeneous or asymmetric to processing element 570. There may be a variety of differences between processing elements 570, 580 in terms of a spectrum of metrics of merit including architectural, microarchitectural, thermal, power consumption characteristics, and the like. These differences may effectively manifest themselves as asymmetry and heterogeneity amongst processing elements 570, 580. In some embodiments, the various processing elements 570, 580 may reside in the same die package.

First processing element 570 may further include memory controller logic (MC) 572 and point-to-point (P-P) interconnects 576 and 578. Similarly, second processing element 580 may include a MC 582 and P-P interconnects 586 and 588. As illustrated in FIG. 5, MCs 572 and 582 couple processing elements 570, 580 to respective memories, namely a memory 532 and a memory 534, which may be portions of main memory locally attached to the respective processors. While MC logic 572 and 582 is illustrated as integrated into processing elements 570, 580, in some embodiments the memory controller logic may be discrete logic outside processing elements 570, 580 rather than integrated therein.

Processing element 570 and processing element 580 may be coupled to an I/O subsystem 590 via respective P-P interconnects 576 and 586 through links 552 and 554. As illustrated in FIG. 5, I/O subsystem 590 includes P-P interconnects 594 and 598. Furthermore, I/O subsystem 590 includes an interface 592 to couple I/O subsystem 590 with a high performance graphics engine 538. In one embodiment, a bus (not shown) may be used to couple graphics engine 538 to I/O subsystem 590. Alternately, a point-to-point interconnect 539 may couple these components.

In turn, I/O subsystem 590 may be coupled to a first link 516 via an interface 596. In one embodiment, first link 516 may be a Peripheral Component Interconnect (PCI) bus, or a bus such as a PCI Express bus or another I/O interconnect bus, although the scope of the present invention is not so limited.

As illustrated in FIG. 5, various I/O devices 514, 524 may be coupled to first link 516, along with a bridge 518 that may couple first link 516 to a second link 510. In one embodiment, second link 520 may be a low pin count (LPC) bus. Various devices may be coupled to second link 520 including, for example, a keyboard/mouse 512, communication device(s) 526 (which may in turn be in communication with the computer network 503), and a data storage unit 528 such as a disk drive or other mass storage device which may include code 530, in one embodiment. The code 530 may include instructions for performing embodiments of one or more of the techniques described above. Further, an audio I/O 524 may be coupled to second link 520.

Note that other embodiments are contemplated. For example, instead of the point-to-point architecture of FIG. 5, a system may implement a multi-drop bus or another such communication topology. Although links 516 and 520 are illustrated as busses in FIG. 5, any desired type of link may be used. In addition, the elements of FIG. 5 may alternatively be partitioned using more or fewer integrated chips than illustrated in FIG. 5.

Figure 6:
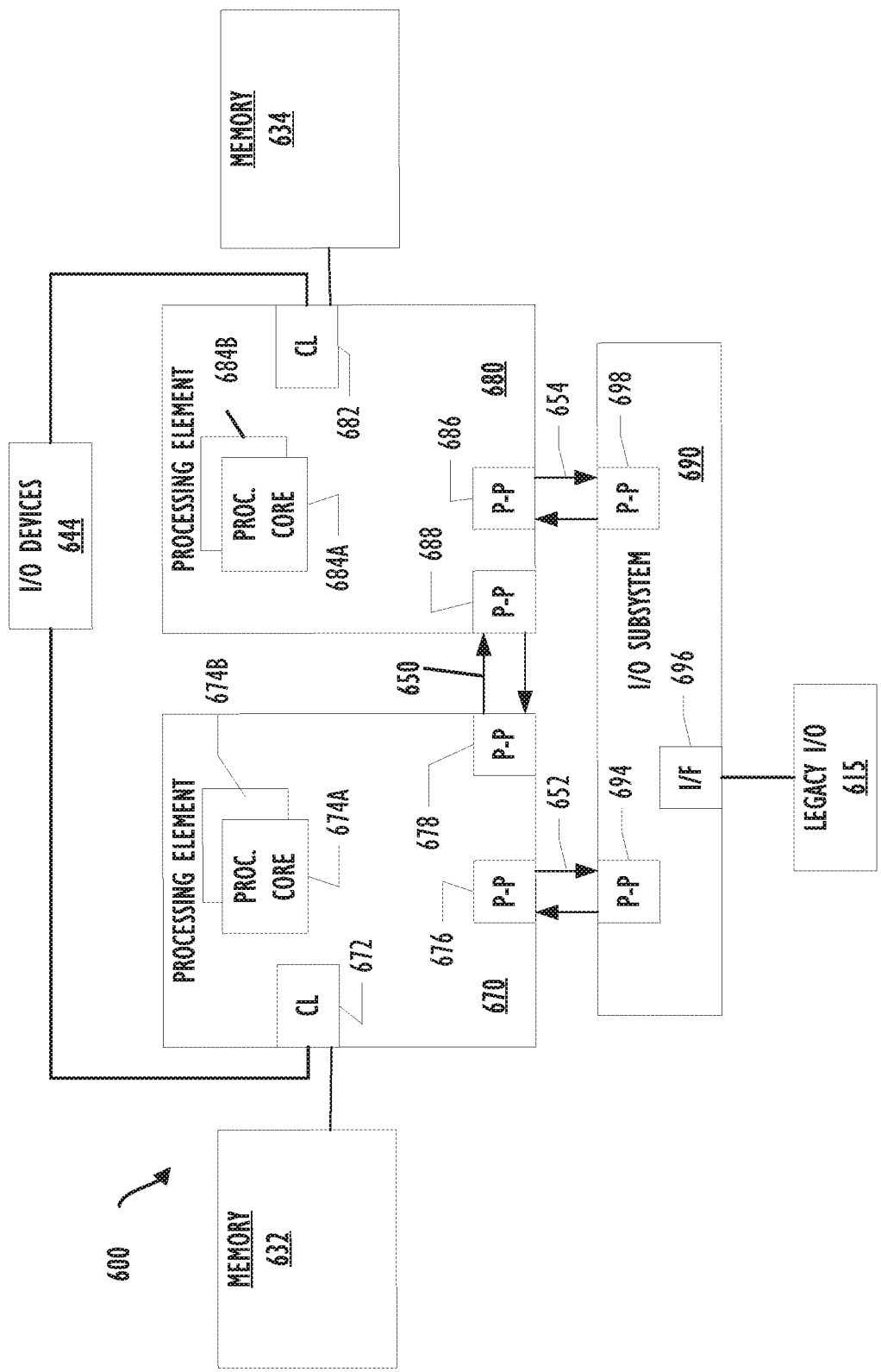
FIG. 6 is a block diagram illustrating a programmable device, according to one embodiment.

Referring now to FIG. 6, a block diagram illustrates a programmable device 600 according to another embodiment. Certain aspects of FIG. 6 have been omitted from FIG. 6 in order to avoid obscuring other aspects of FIG. 6.

FIG. 6 illustrates that processing elements 670, 680 may include integrated memory and I/O control logic ("CL") 672 and 682, respectively. In some embodiments, the 672, 682 may include memory control logic (MC) such as that described above in connection with FIG. 6. In addition, CL 672, 682 may also include I/O control logic. FIG. 6 illustrates that not only may the memories 632, 634 be coupled to the CL 672, 682, but also that I/O devices 644 may also be coupled to the control logic 672, 682. Legacy I/O devices 615 may be coupled to the I/O subsystem 690 by interface 696. Each processing element 670, 680 may include multiple processor cores, illustrated in FIG. 6 as processor cores 674A, 674B, 684A and 684B. As illustrated in FIG. 6, I/O subsystem 690 includes point-to-point (P-P) interconnects 694 and 698 that connect to P-P interconnects 676 and 686 of the processing elements 670 and 680 with links 652 and 654. Processing elements 670 and 680 may also be interconnected by link 650 and interconnects 678 and 688, respectively.

The programmable devices depicted in FIGS. 5 and 6 are schematic illustrations of embodiments of programmable devices that may be utilized to implement various embodiments discussed herein. Various components of the programmable devices depicted in FIGS. 5 and 6 may be combined in a system-on-a-chip (SoC) architecture.

The following examples pertain to further embodiments.

Example 1 is a machine-readable medium, on which are stored instructions, comprising instructions that when executed cause a device to: identify a host hardware configuration; obtain a policy based on the host hardware configuration; monitor two or more memory transactions based on the policy; identify, based on the two or more memory transactions, a memory transaction pattern, wherein the memory transaction pattern is associated with an attempt to obtain unauthorized access to the device; and take an action to interfere with attempts to obtain unauthorized access to the device based on the policy.

In Example 2 the subject matter of Example 1 optionally includes wherein the instructions further comprise instructions that when executed cause the device to verify the obtained policy within a trusted execution environment.

In Example 3 the subject matter of Example 1 optionally includes wherein the action comprises reconfiguring a memory mapping.

In Example 4 the subject matter of Example 1 optionally includes wherein the host hardware configuration comprises information related to a memory controller and a memory module.

In Example 5 the subject matter of any of Examples 1-4 optionally includes wherein the instructions further comprise instructions that when executed cause the device to: log information related to the two or more memory transactions; and transmit the logged information to a server device.

In Example 6 the subject matter of Example 5 optionally includes wherein the logging is configured based on at least one of the policy, hot swapping a memory module, or hot adding a memory module.

In Example 7 the subject matter of Example 1 optionally includes wherein the policy is obtained using a communications channel between a trusted execution environment and a server device.

Example 8 is a programmable device configured for preventing unauthorized access to the programmable device, comprising: a processing element; an field programmable gate array (FPGA) memory controller coupled to the processing element; and a memory on which are stored instructions, comprising instructions that when executed cause the processing element to: monitor two or more memory transactions based on a policy; identify, based on the two or more memory transactions, a memory transaction pattern associated with an attempt to obtain unauthorized access to the programmable device; and configure the FPGA memory controller responsive to the identification to interfere with the attempt.

In Example 9 the subject matter of Example 8 optionally includes wherein the instructions further comprise instructions that when executed cause the processing element to: obtain a bit stream for reconfiguring the FPGA memory controller; and verify the bit stream within a trusted execution environment, wherein the instructions that when executed cause the processing element to configure the FPGA memory controller comprise instructions that when executed cause the processing element to apply the bit stream to the FPGA memory controller.

In Example 10 the subject matter of Example 9 optionally includes wherein the bit stream comprises a register transfer level description of an FPGA circuit configuration.

Example 11 is a machine-readable medium, on which are stored instructions, comprising instructions that when executed cause a server device to: receive a host hardware configuration from a client device; identify a policy based on the host hardware configuration, the policy indicating an action for implementation by the client device based on a memory transaction pattern determined based on two or more memory transaction; and send the policy to the client device.

In Example 12 the subject matter of Example 11 optionally includes wherein the action comprises reconfiguring a memory mapping.

In Example 13 the subject matter of Example 11 optionally includes wherein the host hardware configuration comprises information related to a memory controller and a memory module.

In Example 14 the subject matter of Example 13 optionally includes wherein the memory controller comprises a field-programmable gate array memory controller.

In Example 15 the subject matter of any of Examples 11-14 optionally includes wherein the instructions further comprise instructions that when executed cause the server device to: send, to the client device, a bit stream for reconfiguring a field-programmable gate array (FPGA) memory controller and wherein reconfiguring a memory mapping comprises applying the bit stream to the FPGA memory controller.

In Example 16 the subject matter of Example 15 optionally includes wherein the bit stream comprises a register transfer level description of a FPGA circuit configuration.

In Example 17 the subject matter of any of Examples 11-14 optionally includes wherein the instructions further comprise instructions that when executed cause the server device to: obtain log information related to the two or more memory transactions; determine an action for interfering with attempts to obtain unauthorized access to the client device; and send, to the client device, the determined action.

In Example 18 the subject matter of Example 11 optionally includes wherein the instructions further comprise instructions that when executed cause the server device to: obtain log information related to two or more memory transactions from multiple client devices; identify an attempt to obtain unauthorized access based on the log information from the multiple client devices; determine an action for interfering with attempts to obtain unauthorized access; and send, to the multiple client devices, the determined action.

Example 19 is a method for preventing unauthorized access, comprising: identifying a host hardware configuration of a device; obtaining a policy based on the host hardware configuration; monitoring two or more memory transactions based on the policy; identifying, based on the two or more memory transactions, a memory transaction pattern, wherein the memory transaction pattern is associated with an attempt to obtain unauthorized access to the device; and taking an action to interfere with attempts to obtain unauthorized access to the device based on the policy.

In Example 20 the subject matter of Example 19 optionally includes wherein the action comprises reconfiguring a memory mapping.

In Example 21 the subject matter of Example 19 optionally includes wherein the host hardware configuration comprises information related to a memory controller and a memory module.

In Example 22 the subject matter of Example 21 optionally includes wherein the memory controller comprises a field-programmable gate array memory controller.

In Example 23 the subject matter of any of Examples 19-23 optionally includes further comprising: obtaining a bit stream for reconfiguring a field-programmable gate array (FPGA) memory controller, wherein the action comprises verifying the bit stream and applying the bit stream to the FPGA memory controller.

In Example 24 the subject matter of Example 23 optionally includes wherein the bit stream comprises a register transfer level description of a FPGA circuit configuration.

In Example 25 the subject matter of any of Examples 19-23 optionally includes further comprising: logging information related to the two or more memory transactions; and transmitting the logged information to a server device.

Example 26 is an apparatus for preventing unauthorized access by a device, comprising: means for identifying a host hardware configuration of the device; means for obtaining a policy based on the host hardware configuration; means for monitoring two or more memory transactions based on the policy; means for identifying, based on the two or more memory transactions, a memory transaction pattern, wherein the memory transaction pattern is associated with an attempt to obtain unauthorized access to the device; and means for taking an action to interfere with attempts to obtain unauthorized access to the device based on the policy.

In Example 27 the subject matter of Example 26 optionally includes further comprising means for verifying the obtained policy within a trusted execution environment.

In Example 28 the subject matter of Example 26 optionally includes wherein the action comprises reconfiguring a memory mapping.

In Example 29 the subject matter of Example 26 optionally includes wherein the host hardware configuration comprises information related to a memory controller and a memory module.

In Example 30 the subject matter of any of Examples 26-29 optionally includes further comprising: means for logging information related to the two or more memory transactions; and means for transmitting the logged information to a server device.

In Example 31 the subject matter of Example 30 optionally includes wherein the logging is configured based on at least one of the policy, hot swapping a memory module, or hot adding a memory module.

In Example 32 the subject matter of Example 26 optionally includes wherein the policy is obtained using a communications channel between a trusted execution environment and a server device.

Example 33 is an apparatus for preventing unauthorized access to a client device, comprising: means for receiving, by a server device, a host hardware configuration from the client device; means for identifying a policy based on the host hardware configuration, the policy indicating an action for implementation by the client device based on a memory transaction pattern determined based on two or more memory transaction; and means for sending the policy to the client device.

In Example 34 the subject matter of Example 33 optionally includes wherein the action comprises reconfiguring a memory mapping.

In Example 35 the subject matter of Example 33 optionally includes wherein the host hardware configuration comprises information related to a memory controller and a memory module.

In Example 36 the subject matter of Example 35 optionally includes wherein the memory controller comprises a field-programmable gate array memory controller.

In Example 37 the subject matter of any of Examples 33-36 optionally includes further comprising: means for sending, to the client device, a bit stream for reconfiguring a field-programmable gate array (FPGA) memory controller and wherein reconfiguring a memory mapping comprises applying the bit stream to the FPGA memory controller.

In Example 38 the subject matter of Example 37 optionally includes wherein the bit stream comprises a register transfer level description of a FPGA circuit configuration.

In Example 39 the subject matter of any of Examples 33-36 optionally includes further comprising: means for obtaining log information related to the two or more memory transactions; means for determining an action for interfering with attempts to obtain unauthorized access to the client device; and means for sending, to the client device, the determined action.

In Example 40 the subject matter of Example 33 optionally includes further comprising: means for obtaining log information related to two or more memory transactions from multiple client devices; means for identifying an attempt to obtain unauthorized access based on the log information from the multiple client devices; means for determining an action for interfering with attempts to obtain unauthorized access; and means for sending, to the multiple client devices, the determined action.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

We claim:

1. A non-transitory machine-readable medium, on which are stored instructions, comprising instructions that when executed cause a device to:
   identify a host hardware configuration;
   obtain a policy based on the host hardware configuration;
   monitor two or more memory transactions based on the policy;
   identify, based on the two or more memory transactions, a memory transaction pattern, wherein the memory transaction pattern is associated with an attempt to obtain unauthorized access to the device; and
   take an action to interfere with attempts to obtain unauthorized access to the device based on the policy, wherein the action includes reconfiguring circuitry of the device to modify a mapping of a system physical address to a dynamic random access memory (DRAM) physical address.

2. The non-transitory machine-readable medium of claim 1, wherein the instructions further comprise instructions that when executed cause the device to verify the obtained policy within a trusted execution environment.

3. The non-transitory machine-readable medium of claim 1, wherein the host hardware configuration comprises information related to a memory controller and a memory module.

4. The non-transitory machine-readable medium of claim 1, wherein the instructions further comprise instructions that when executed cause the device to:
   log information related to the two or more memory transactions; and
   transmit the logged information to a server device.

5. The non-transitory machine-readable medium of claim 4, wherein the logging is configured based on at least one of the policy, hot swapping a memory module, or hot adding a memory module.

6. The non-transitory machine-readable medium of claim 1, wherein the policy is obtained using a communications channel between a trusted execution environment and a server device.

7. A method for preventing unauthorized access, comprising:
   identifying a host hardware configuration of a device;
   obtaining a policy based on the host hardware configuration;
   monitoring two or more memory transactions based on the policy;
   identifying, based on the two or more memory transactions, a memory transaction pattern, wherein the memory transaction pattern is associated with an attempt to obtain unauthorized access to the device; and
   taking an action to interfere with attempts to obtain unauthorized access to the device based on the policy, wherein the action includes reconfiguring circuitry of the device to modify a mapping of a system physical address to a dynamic random access memory (DRAM) physical address.

8. The method of claim 7, wherein the host hardware configuration comprises information related to a memory controller and a memory module.

9. The method of claim 8, wherein the memory controller comprises a field-programmable gate array memory controller.

10. The method of claim 7, further comprising:
    obtaining a bit stream for reconfiguring a field-programmable gate array (FPGA) memory controller,
    wherein the action comprises verifying the bit stream and applying the bit stream to the FPGA memory controller.

11. The method of claim 10, wherein the bit stream comprises a register transfer level description of a FPGA circuit configuration.

12. The method of claim 7, further comprising:
logging information related to the two or more memory transactions; and
transmitting the logged information to a server device.

13. A device comprising:
circuitry to:
identify a host hardware configuration;
obtain a policy based on the host hardware configuration;
monitor two or more memory transactions based on the policy;
identify, based on the two or more memory transactions, a memory transaction pattern, wherein the memory transaction pattern is associated with an attempt to obtain unauthorized access to the device; and
take an action to interfere with attempts to obtain unauthorized access to the device based on the policy, wherein the action includes reconfiguring the circuitry of the device to modify a mapping of a system physical address to a dynamic random access memory (DRAM) physical address.

14. The device of claim 13, wherein the circuitry is further to verify the obtained policy within a trusted execution environment.

15. The device of claim 13, wherein the host hardware configuration comprises information related to a memory controller and a memory module.

16. The device of claim 13, wherein the circuitry is further to:
log information related to the two or more memory transactions; and
transmit the logged information to a server device.

17. The device of claim 16, wherein the logging is configured based on at least one of the policy, hot swapping a memory module, or hot adding a memory module.

18. The device of claim 13, wherein the policy is obtained using a communications channel between a trusted execution environment and a server device.

* * * * *